US007024536B2

(12) United States Patent
Park et al.

(10) Patent No.: US 7,024,536 B2
(45) Date of Patent: Apr. 4, 2006

(54) TRANSLATION LOOK-ASIDE BUFFER FOR IMPROVING PERFORMANCE AND REDUCING POWER CONSUMPTION OF A MEMORY AND MEMORY MANAGEMENT METHOD USING THE SAME

(75) Inventors: Sang-hyun Park, Hwasung (KR); Seh-Woong Jeong, Seoul (KR); Shin-dug Kim, Goyang (KR); Jung-Hoon Lee, Goyang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 221 days.

(21) Appl. No.: 10/253,408

(22) Filed: Sep. 24, 2002

(65) Prior Publication Data

US 2003/0182532 A1    Sep. 25, 2003

(30) Foreign Application Priority Data

Mar. 19, 2002  (KR) ............................... 2002-14710

(51) Int. Cl.
*G06F 12/10*    (2006.01)
(52) U.S. Cl. .................. 711/206; 711/200; 711/202; 711/203; 711/205; 711/207; 711/208; 711/128; 711/108
(58) Field of Classification Search ................ 711/202, 711/203, 205, 206–207, 209, 128, 200, 118
See application file for complete search history.

(56) References Cited

U.S. PATENT DOCUMENTS 5,475,825 A * 12/1995 Yonezawa et al. ............ 711/1
5,860,145 A * 1/1999 Nogami ....................... 711/207
5,946,716 A * 8/1999 Karp et al. ................... 711/207
6,047,354 A    4/2000 Yoshioka et al.
6,079,004 A * 6/2000 Liedtke ........................ 711/207
6,138,225 A * 10/2000 Upton et al. ................. 711/207
6,212,613 B1 * 4/2001 Belair .......................... 711/207
6,339,816 B1 * 1/2002 Bausch ........................ 711/163

(Continued)

FOREIGN PATENT DOCUMENTS

JP    362037753 A  *  2/1987

(Continued)

OTHER PUBLICATIONS

English Abstract***.
Nesimoglu et al., ▌ Dual TLB Structure to Support Two Pages Sizes ▌ Apr. 13, 2000, vol. 36, No. 8, pp. 705-706.

Primary Examiner—B. James Peikari
Assistant Examiner—Zhuo H. Li
(74) Attorney, Agent, or Firm—F. Chau & Associates, LLC (57) ABSTRACT

A translation look-aside buffer (TLB) capable of reducing power consumption and improving performance of a memory is provided. The fully-associative TLB which converts a virtual address into a physical address, comprises a first TLB having a plurality of banks; a second TLB having a plurality of entries, each of which having one virtual page number and $2^N$ physical page numbers, wherein N is a natural number; and a selection circuit for outputting an output signal of the first TLB to the second TLB in response to a selection signal, wherein each bank of the first TLB has a plurality of entries, each of which has one virtual page number and one physical page number. The size of a page indicated by a virtual page number of the first TLB is different from the size of a page indicated by a virtual page number of the second TLB.

22 Claims, 7 Drawing Sheets

U.S. PATENT DOCUMENTS

| | | | |
|---|---|---|---|
| 6,374,341 B1 * | 4/2002 | Nijhawan et al. | 711/207 |
| 6,418,521 B1 * | 7/2002 | Mathews et al. | 711/207 |
| 6,535,528 B1 * | 3/2003 | Rhodes et al. | 370/517 |
| 6,662,289 B1 * | 12/2003 | Ang | 711/202 |

FOREIGN PATENT DOCUMENTS

| | | | |
|---|---|---|---|
| JP | 11065930 A | * | 3/1999 |
| JP | 00148589 | | 5/2000 |

* cited by examiner

TRANSLATION LOOK-ASIDE BUFFER FOR IMPROVING PERFORMANCE AND REDUCING POWER CONSUMPTION OF A MEMORY AND MEMORY MANAGEMENT METHOD USING THE SAME

BACKGROUND OF THE INVENTION

1. Field of the Invention

The present invention relates generally to a memory device, and more particularly, to a translation look-aside buffer (TLB) for improving performance and reducing power consumption of a memory and a memory management method using the same.

2. Description of the Related Art

In general, a translation look-aside buffer (TLB) is used to reduce memory access time and power consumption and to improve performance of a memory. The TLB is a cache memory having entries for converting virtual addresses to physical addresses.

The TLB is used to reduce average translation time needed in converting addresses in most computers that support paged virtual memory.

There are generally three methods for improving the performance of the TLB. First, a method supporting more entries; second, a method increasing the size of a page; and third, a method supporting multiple page sizes.

However, if the number of entries supported by the TLB increases, latency of memory reference occurs, and if the TLB is implemented by a content addressable memory (CAM), more entries are compared at each reference such that power consumption of the TLB substantially increases.

If the size of a page increases, the coverage of memory mapping increases, but due to increases in internal fragmentation, waste of memory increases, and due to the limited number of pages being mapped, the number of processes is restricted.

Therefore, the best method for improving the performance of the TLB is supporting multiple page sizes. The best among the methods supporting multiple page sizes is receiving predetermined information from the operating system or the compiler and allocating an optimal page size to the TLB. However, this method can apply to the system area of the operating system, but cannot apply to a user area.

SUMMARY OF THE INVENTION

Accordingly, it is an objective of the present invention to provide a translation look-aside buffer (TLB) for improving performance and reducing power consumption and a memory management method using the same.

According to an embodiment of the present invention, there is provided a fully-associative translation look-aside buffer (TLB) for converting a virtual address into a physical address, the TLB comprising a first TLB having a plurality of banks; a second TLB having a plurality of entries, each of the plurality of entries having one virtual page number and $2^N$ physical page numbers, wherein N is a natural number; and a selection circuit for outputting an output signal of the first TLB to the second TLB in response to a selection signal, wherein each bank of the first TLB has a plurality of entries, each of the plurality of entries having one virtual page number and one physical page number.

It is preferable that the size of a page indicated by a virtual page number of the first TLB is different from the size of a page indicated by a virtual page number of the second TLB.

It is preferable that the $2^N$ physical page numbers are physical pages numbers corresponding to continuous virtual page numbers, respectively.

It is preferable that if each of $(2^N-1)$ physical page numbers among the $2_N$ physical page number is sent from the first TLB to the second TLB, the $(2^N-1)$ physical page numbers are nullified in the respective entries of the first TLB.

It is preferable that the physical page numbers forming an entry of the first TLB are different from the physical page numbers forming an entry of the second TLB.

It is preferable that each bank of the first TLB is selected by low-order bits including the least significant bit of a virtual page number, which is being input.

According to another embodiment of the present invention, there is provided a fully-associative TLB for converting a virtual address having a virtual page number and an offset, into a physical address having a physical page number and the offset, the TLB comprising a first TLB having a first bank and a second bank, wherein the first bank or the second bank has a plurality of entries, each of the plurality of entries having one virtual page number and one physical page number; a second TLB having a plurality of entries, each of the plurality of entries having one virtual page number and four physical page numbers; and a selection circuit which, in response to a selection signal, outputs an output signal of the first TLB to the second TLB.

It is preferable that the four physical page numbers are physical page numbers corresponding to continuous virtual page numbers, respectively.

It is preferable that if three physical page number among the four page numbers are sent from the first TBL, the three physical page numbers are nullified in the respective entries of the first TLB.

It is preferable that the physical page numbers forming an entry of the first TLB are different from the physical page numbers forming an entry of the second TLB.

It is preferable that the size of a page indicated by a virtual page number of the first bank or the second bank of the first TLB is different from the size of a page indicated by a virtual page number of the second TLB.

According to yet another embodiment of the present invention, there is provided a fully-associative TLB for converting a virtual address into a physical address, the TLB comprising a first fully-associative TLB having a plurality of banks, each of the plurality of banks having a plurality of entries, each of the plurality of entries having a first page size and indicating the first page; and a second fully-associative TLB having a plurality of entries, each of the plurality of entries having a second page size and indicating the second page, wherein one entry indicating the second page size has mapping information on a virtual page number to which access failed, and mapping information on a plurality of virtual page numbers succeeding to the virtual page number.

It is preferable that the TLB further comprises a selection for sending mapping information on the plurality of virtual page numbers adjacent to the virtual page number to which access failed in response to a selection signal.

According to another embodiment of the present invention, there is provided a memory management method using a TLB, the method comprising accessing a first fully-associative TLB having a plurality of banks, each of the plurality of banks having a plurality of entries, each entry having one virtual page number and one physical page number, and a second TLB having a plurality of entries, each entry having one virtual page number and a plurality of physical page numbers; if a miss for a first virtual page number occurs in the first TLB and in the second TLB, accessing the first TLB to determine whether or not a predetermined number of virtual page numbers adjacent to the first virtual page number exist in the first TLB, while the miss for the first virtual page number is processed; if the predetermined number of virtual page numbers adjacent to the first virtual page number exist in the first TLB, sending physical page numbers corresponding to the predetermined number of respective virtual page numbers adjacent to the first virtual page number, to the second TLB; and generating a new entry of the second TLB containing a physical page number corresponding to the first virtual page number to which access failed, and physical page numbers corresponding to the predetermined number of respective virtual page numbers adjacent to the first virtual page number, and outputting the physical page number corresponding to the first virtual page number.

It is preferable that each bank of the first TLB is selected by low-order bits including the least significant bit of the first virtual page number.

It is preferable that the new entry of the second TLB contains mapping information on each of a predetermined number of entries of the first TLB.

It is preferable that the memory management method further comprises nullifying entries of the first TLB corresponding to the predetermined number of respective virtual page numbers adjacent to the first virtual page number.

It is preferable that the physical page numbers forming an entry of the first TLB are different from the physical page numbers forming an entry of the second TLB.

According to a further embodiment of the present invention, there is provided a memory management method using a TLB, the method comprising accessing a first fully-associative TLB having a plurality of banks, each of the plurality of banks having a plurality of entries, each entry having one virtual page number and one physical page number, and a second TLB having a plurality of entries, each entry having one virtual page number and a plurality of physical page numbers; and in response to a result of an access to the TLB, sending physical page numbers corresponding to a predetermined number of respective virtual page numbers adjacent to a first virtual page number from the first TLB to the second TLB, wherein the physical page numbers forming an entry of the first TLB are different from the physical page numbers forming an entry of the second TLB.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF PREFERRED EMBODIMENTS

Figure 1:
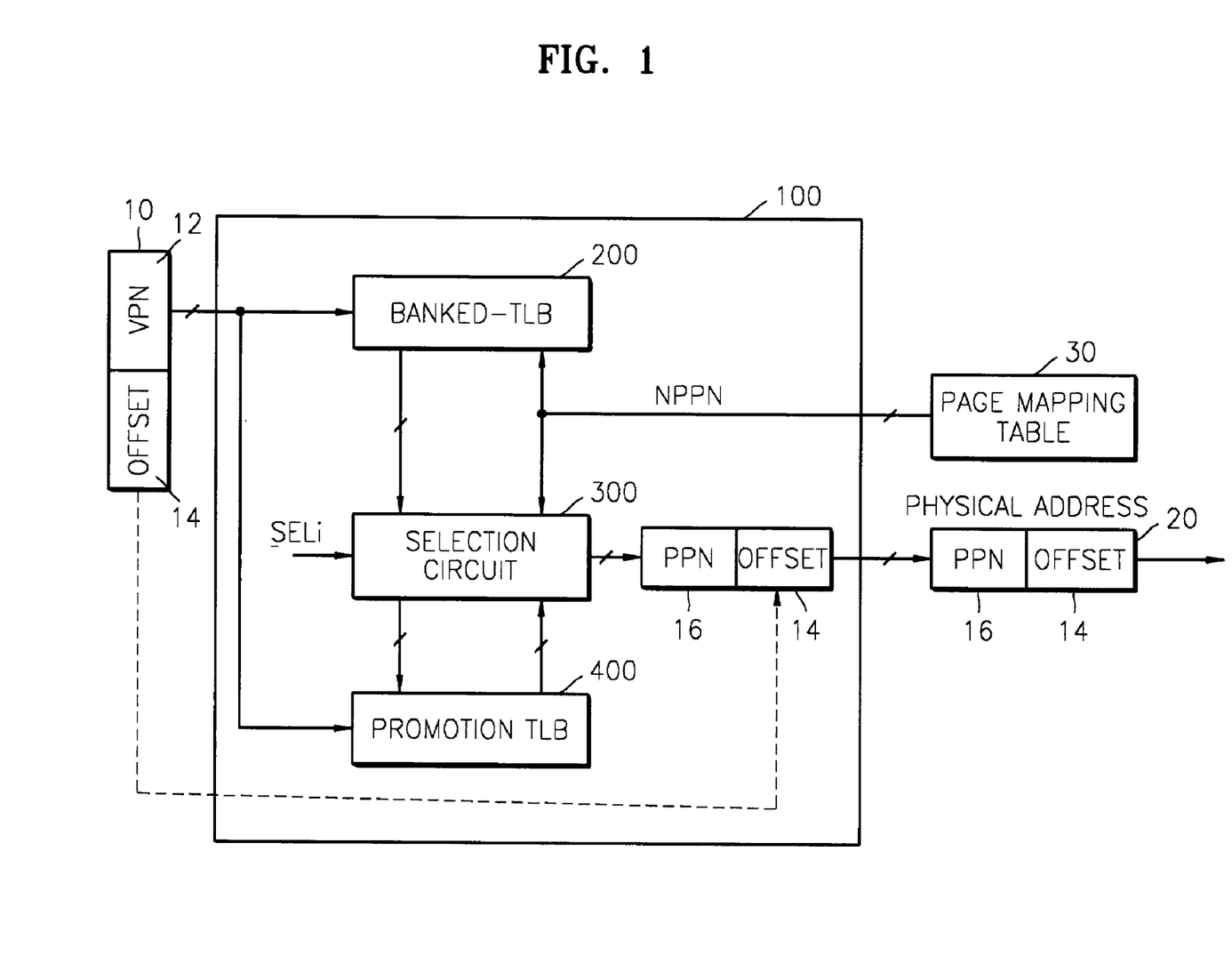
FIG. 1 is a block diagram of a translation look-aside buffer (TLB) according to a preferred embodiment of the present invention.

FIG. 1 is a block diagram of a TLB 100 according to a preferred embodiment of the present invention. Referring to FIG. 1, the TLB 100 comprises a banked TLB 200, a selection circuit 300, and a promotion TLB 400.

The TLB 100 converts a virtual address 10 having a virtual page number (VPN) 12 and an offset 14, into a physical address 20 having a physical page number (PPN) 16 and an offset 14. The banked TLB 200 and the promotion TLB 400 are fully associative TLBs.

The banked TLB 200 comprises a plurality of banks, and each bank has a plurality of entries, each entry having a first page size, and the promotion TLB 400 comprises a plurality of entries, each entry having a second page size. Each of the plurality of entries having the second page size includes mapping information of a virtual page number to which access failed and respective mapping information on a plurality of virtual page numbers succeeding the virtual page number.

In response to a selection signal SELi, the selection circuit 300 sends an output signal (for example, a physical page number) of the banked TLB 200 to the promotion TLB 400, or sends a physical address having the output signal of the banked TLB 200 and an offset to a main memory.

Also, in response to the selection signal SELi, the selection circuit 300 sends a physical address having an output signal (for example, a physical page number) of the promotion TLB 400 and an offset to the main memory.

Also, in response to the selection signal SELi, the selection circuit 300 sends respective mapping information on the plurality of virtual page numbers succeeding the virtual page number, to which access failed, to the promotion TLB 400.

Then, in response to the selection signal SELi, the selection circuit 300 outputs a new physical page number NPPN which is output from the page mapping table 30 to the banked TLB 200 or the promotion TLB 400.

Figure 2:
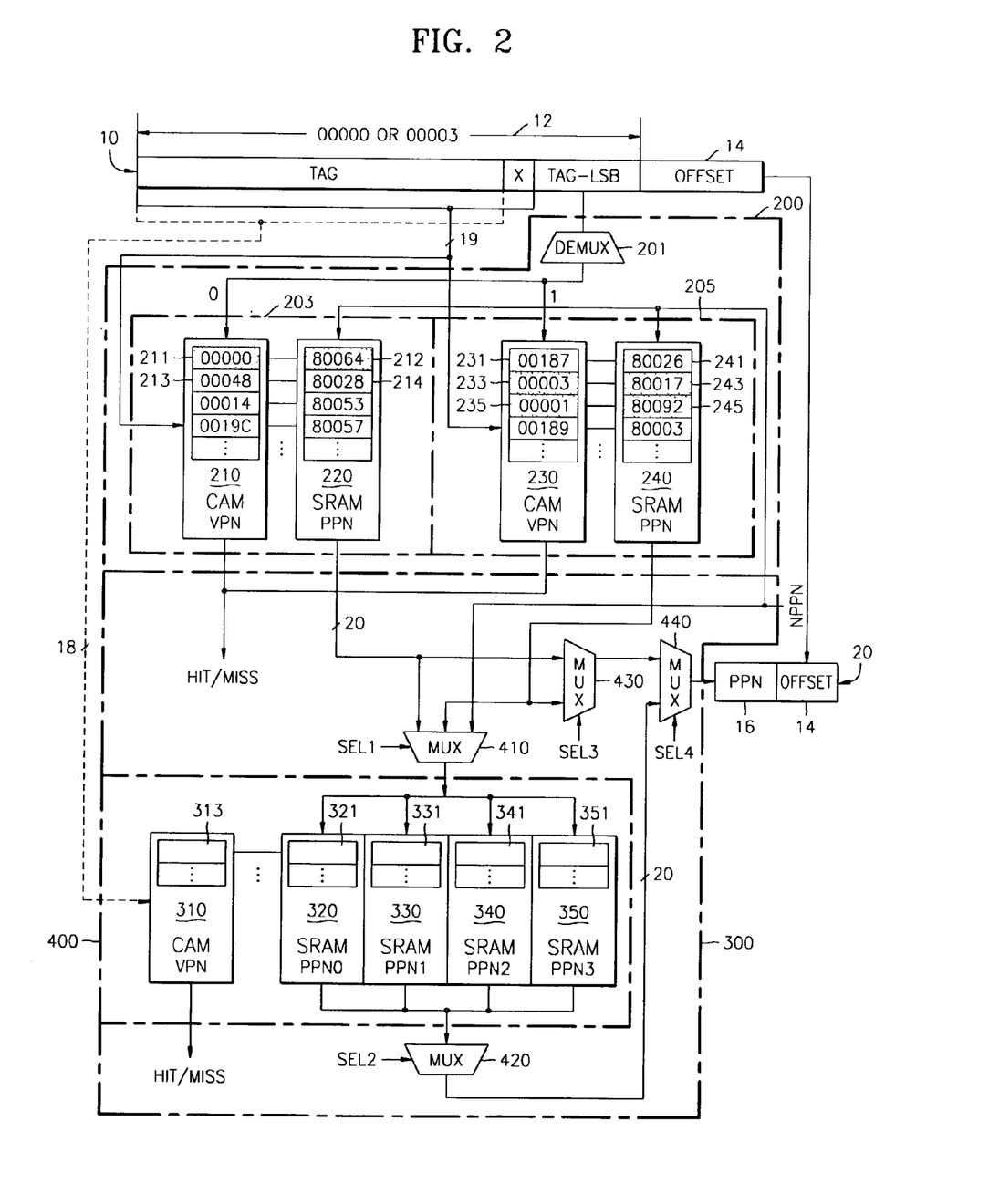
FIGS. 2 through 4 are detailed circuit diagrams of the TLB shown in FIG. 1.

FIG. 2 is a circuit diagram of a preferred embodiment of the present invention. For convenience of description, two banks 203 and 205 are shown as banked TLBs 200. However, it is clear that the banked TLBs 200 according to the present invention may be a plurality of banks to reduce power consumption.

A virtual address 10 which is input to a TLB comprises a tag field TAG, a bank selection field X and TAG_LSB, and an offset 14. A virtual page number 12 comprises a tag field TAG, a bank selection field X and a least significant bit TAG_LSB.

The size of a page indicated by the tag field TAG, the bank selection field X and TAG_LSB, or the offset 14 may vary. It is preferable that the number of bits of X is (the number of bits of the virtual page number of a banked TLB)—(the number of bits of the virtual page number of a promotion TLB)—(the number of bits of TAG_LSB).

Each bank 203 and 205 has a PPN unit 220 and 240 formed with static random access memories (SRAMs) for storing data, that is, physical page numbers, and a VPN unit 210 and 230 formed with content addressable memories (CAMs) for storing virtual page numbers.

The banked TLB 200 has a demultiplexer 201 for selecting the first bank 203 or the second bank 205. The demultiplexer 201 may be replaced by an inverter.

For example, if the least significant bit TAG_LSB of a virtual page number 12 is "0", the demultiplexer 201 selects the first bank 203, and if the least significant bit TAG_LSB of the virtual page number is "1", the demultiplexer 201 selects the second bank 205.

That is, to selectively refer to or access the first bank 203 or the second bank 205, the least significant bit LSB of each virtual page number of the first bank 203 is "0" and the least significant bit LSB of each virtual page number of the second bank 205 is "1".

Each bank 203 and 205 has a plurality of entries, and each entry has a virtual page number and a physical page number. One entry comprises a virtual page number 211 and one physical page number 212, and another entry comprises a virtual page number 213 and one physical page number 214.

Also, one entry comprises one virtual page number 231 and one physical page number 241.

The banked TLB 200 accesses the virtual page number of each entry and compares it with the virtual page number (or tag TAG) of an input virtual address, and according to the result, generates a hit HIT or a miss MISS.

The promotion TLB 400 comprises PPN units 320 through 350 formed with SRAMs for storing data, that is, physical page addresses, and VPN units 310 formed with CAMs for storing virtual page numbers.

The promotion TLB 400 comprises a plurality of entries, and each entry comprises one virtual page number and $2^N$ physical page numbers (N is a natural number).

Among the $2^N$ physical page numbers, each of ($2^N-1$) physical pages is the physical page number sent from the banked TLB 200.

One entry of the promotion TLB 400 of FIG. 2 has one virtual page number 313 and four physical page numbers 321 through 351. Among the four physical page numbers, three physical page numbers are physical page numbers that already existed in the banked TLB 200.

The four physical page numbers are physical pages corresponding to respective continuous virtual page numbers. When each of three physical page numbers among the four physical page numbers is sent from the bank TLB 200 to the promotion TLB 400, each entry in the banked TLB, including the three physical page numbers that existed in the banked TLB 200 is nullified. Accordingly, physical page numbers forming the entries of the banked TLB 200 are different from physical page numbers forming the entries of the promotion TLB 400.

It is preferable that the size of a page indicated by a virtual page number of the promotion TLB 400 is different from the size of a page indicated by a virtual page number of the banked TLB 200.

Also, since the fully associative TLB according to this embodiment of the present invention can store four physical page numbers 321 through 351 in one entry, the TLB 100 according to the present invention can support different page sizes without support of an operating system.

One entry of the promotion TLB 400 has information on four entries of the banked TLB 200. That is, one entry of the promotion TLB 400 contains mapping information of three entries forming the banked TLB 200.

The promotion TLB 400 accesses the virtual page number (or tag) of each entry and compares it with the virtual page number (or tag) of an input virtual address, and according to the result, generates a hit HIT or a miss MISS.

The selection circuit 300 comprises a plurality of multiplexers 410 through 440. In response to a first selection signal SEL1, the multiplexer 410 outputs the output signal of each PPN unit 220 and 240, or a new physical page number NPPN which is input from the page mapping table, to the PPN units 320 through 350.

In response to a third selection signal SEL3, the multiplexer 430 outputs the output signal of the PPN unit 220 or the output signal of the PPN unit 240, to the multiplexer 440. It is preferable that the third selection signal SEL3 is the least significant bit TAG_LSB of a virtual page number.

In response to a second selection signal SEL2, the multiplexer 420 selects one among output signals of the PPN units 320 through 350, and outputs the selected signal to the multiplexer 440. It is preferable that the second selection signal SEL2 is low-order bits X and TAG_LSB containing the least significant bit TAG_LSB of a virtual page number.

Therefore, the promotion TLB 400 having the structure described above spends the same power as spent in only one PPN unit.

In response to a fourth selection signal SEL4, the multiplexer 440 outputs the output signal of the multiplexer 420 or 430. It is preferable that the fourth selection signal SEL4 is generated using a hit HIT or a miss MISS of the banked TLB 200 and the promotion TLB 400.

The multiplexer 440 outputs a physical page number corresponding to the virtual page number of an input virtual address. Therefore, the TLB according to the present invention generates a physical address by combining the output signal of the multiplexer 440 and the offset of an input virtual address, and outputs the physical address 20 to the main memory (not shown).

Figure 3:
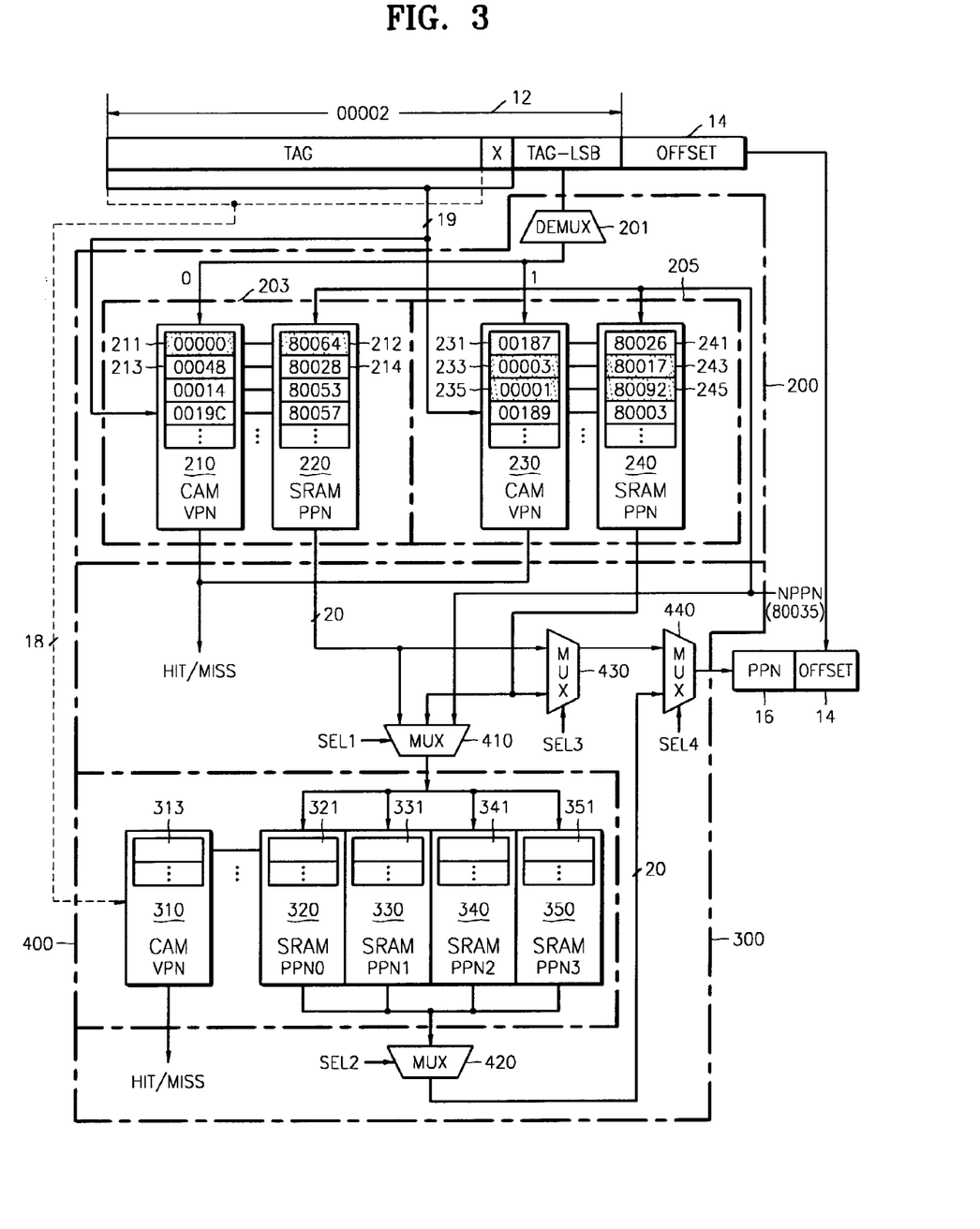
Figure 4:
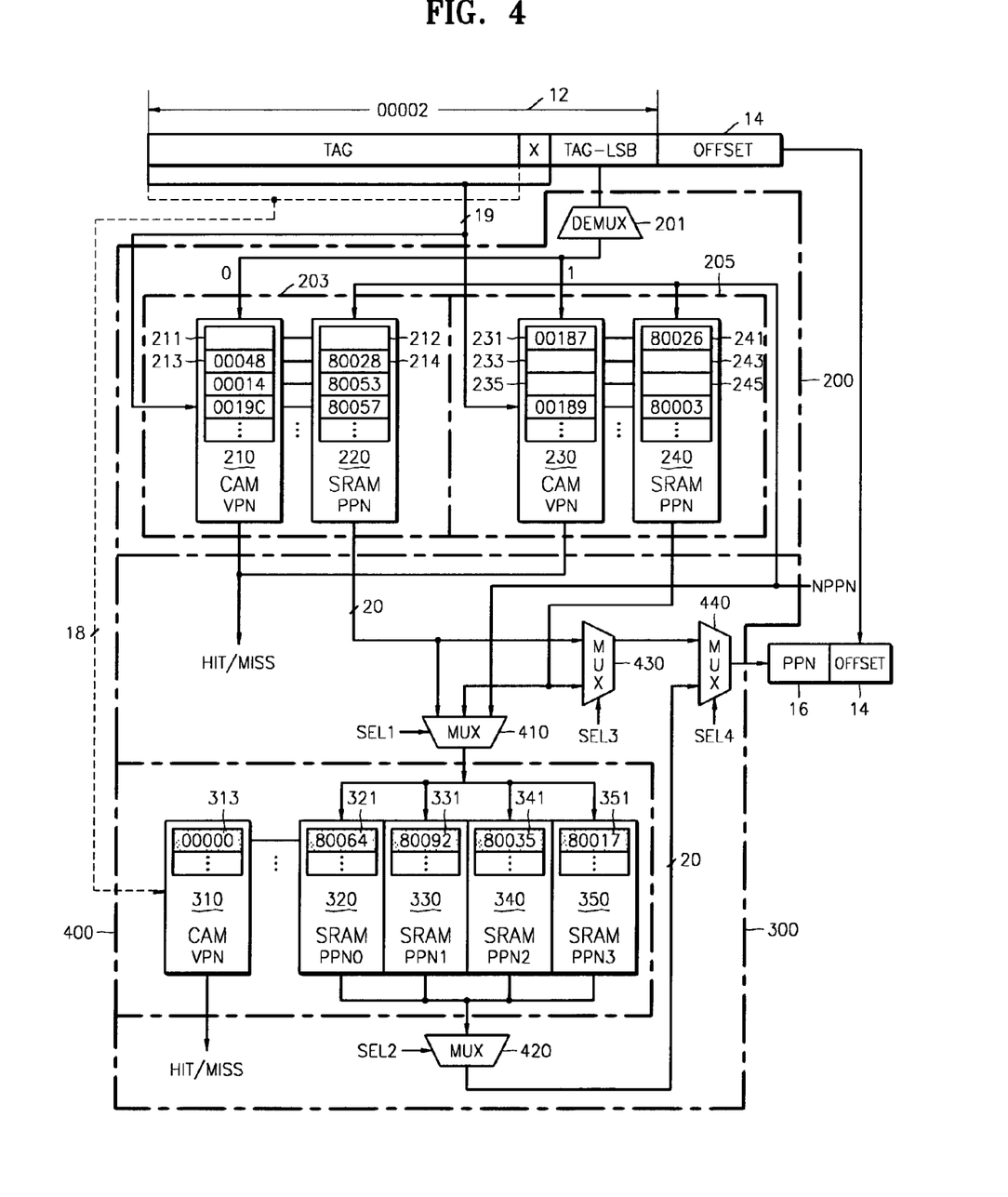

Referring to FIGS. 2 through 4, the operation of the TLB according to a preferred embodiment of the present invention will now be explained in more detail. Here, it is assumed that the size of a page indicated by each entry of the VPN unit 210 storing the virtual page number of the banked TLB 200 is 4 KB, one entry of the promotion TLB 400 comprises a VPN unit 313 storing one virtual page number and PPN units 321 through 351 storing four physical page numbers, and the size of a page indicated by each entry is 16 KB. Also, it is assumed that the virtual page number 12 is 20 bits, X bit is 1 bit, and TAG_LSB is 1 bit.

The size of a page indicated by each entry of the VPN unit 210 of the first bank 203 is 4 KB and the size of a page indicated by each entry of the VPN unit 230 of the second bank 205 is 4 KB.

The size of a page indicated by each entry of the VPN unit 310 of the promotion TLB 400 is 16 KB, the number of entries of the first bank 203 is 32, the number of entries of the second bank 205 is 32, and the number of entries of the promotion TLB is 16.

Therefore, if it is assumed that the size of a page indicated by each virtual page of the VPN unit 210 storing the virtual page number of the banked TLB 200 according to the present invention is 4 KB, 8 KB, or 16 KB, the size of a page indicated by each virtual page number of the VPN unit 310 storing the virtual page number of the promotion TLB 400 may be 16 KB, 32 KB, or 64 KB.

Referring to FIG. 2, if a virtual address containing a virtual page number and an offset generated from a central processing unit (CPU) is input to the TLB, the banked TLB 200 and the promotion TLB 400 access respective entries at the same time to seek the input virtual page number.

If a hit HIT occurs in the banked TLB 200, the selection circuit 300 outputs a physical page number corresponding to the hit virtual page number. Accordingly, the TLB outputs a physical address 20 containing a physical page number 16 and an offset 14.

For example, if an input virtual page number is 00000 (a 20 bit, hexadecimal number), in response to the least significant bit (0) of the input virtual page number, the banked TLB 200 access the first bank 203, and at the same time the promotion TLB 400. It is preferable that this access is completed within one clock cycle.

Here, the promotion TLB 400 receives 18 bits (0000 0000 0000 0000 00) except the least significant bit TAG_LSB and X bit in the input virtual page number (0000 0000 0000 0000 0000), adds "00" after the least significant bit (0) of the 18 bits, and access entries to check whether or not there is the same virtual page number as the input virtual page number (0000 0000 0000 0000 00).

Here, the least significant bit TAB_LSB and X bit select one PPN Unit among the four PPN units 320 through 350 included in one entry.

That is, if a hit occurs in the promotion TLB 400, four physical page numbers are referred to, and among them, one physical page number is sent to the multiplexer 440 in response to the least significant bit TAG_LSB and X bit.

That is, if a virtual page number that is 00000 (a 20 bit, hexadecimal number) is input to the TLB, a hit HIT occurs in the first bank 203 because the first bank 203 has a virtual page number 211 corresponding to the virtual page number 00000.

Accordingly, in response to the third selection signal SEL3 (for example, TAG_LSB), the multiplexer 430 outputs a physical page number 80064 212 corresponding to the virtual page number 00000 to the multiplexer 440.

In response to the fourth selection signal SEL4 (for example, this can be made using the hit HIT of the banked TLB), the multiplexer 440 outputs the output signal 80064 of the multiplexer 430. The TLB outputs a physical address having a physical page number 16 stored in the first bank 203 and an offset 14, to the main memory.

Also, if the input virtual page number is 00003 (a 20 bit, hexadecimal number), the second bank 205 is selected because the least significant bit TAG_LSB of the virtual page number 00003 is "1".

Since the second bank 205 has a virtual page number corresponding to the input virtual page number 0003 233, a hit HIT occurs in the second bank 205.

Accordingly, in response to the third selection signal SEL3, the multiplexer 430 outputs a physical page number 80017 243 corresponding to the virtual page number 00003 to the multiplexer 440.

In response to the fourth selection signal SEL4 (for example, this can be made using a hit HIT of the banked TLB), the multiplexer 440 outputs the output signal 80017 of the multiplexer 430 to the main memory. Then, the TLB outputs a physical address having a physical page number 16 stored in the second bank 205 and an offset 14.

If a hit occurs in the banked TLB 200, the physical address is determined by a physical page number stored in each bank 203 and 205 of the banked TLB 200 and the offset of the input virtual address.

Referring to FIG. 3, the operation of the TLB when a virtual page number that is 0002 (a 20 bit, hexadecimal number) is input and virtual page numbers 00000, 00001, and 00003, already exist in the banked TLB 200 will now be explained in detail.

First, if a virtual page number 00002 (a 20 bit, hexadecimal number) generated by the CPU is input to the TLB, since the least significant bit of the virtual page number 00002 is "0", the first bank 203 of the banked TLB 200 and at the same time the promotion TLB 400 are referred to. For the virtual page number 00002, a miss MISS occurs both in the first bank 203 and in the promotion TLB 400.

Figure 6:
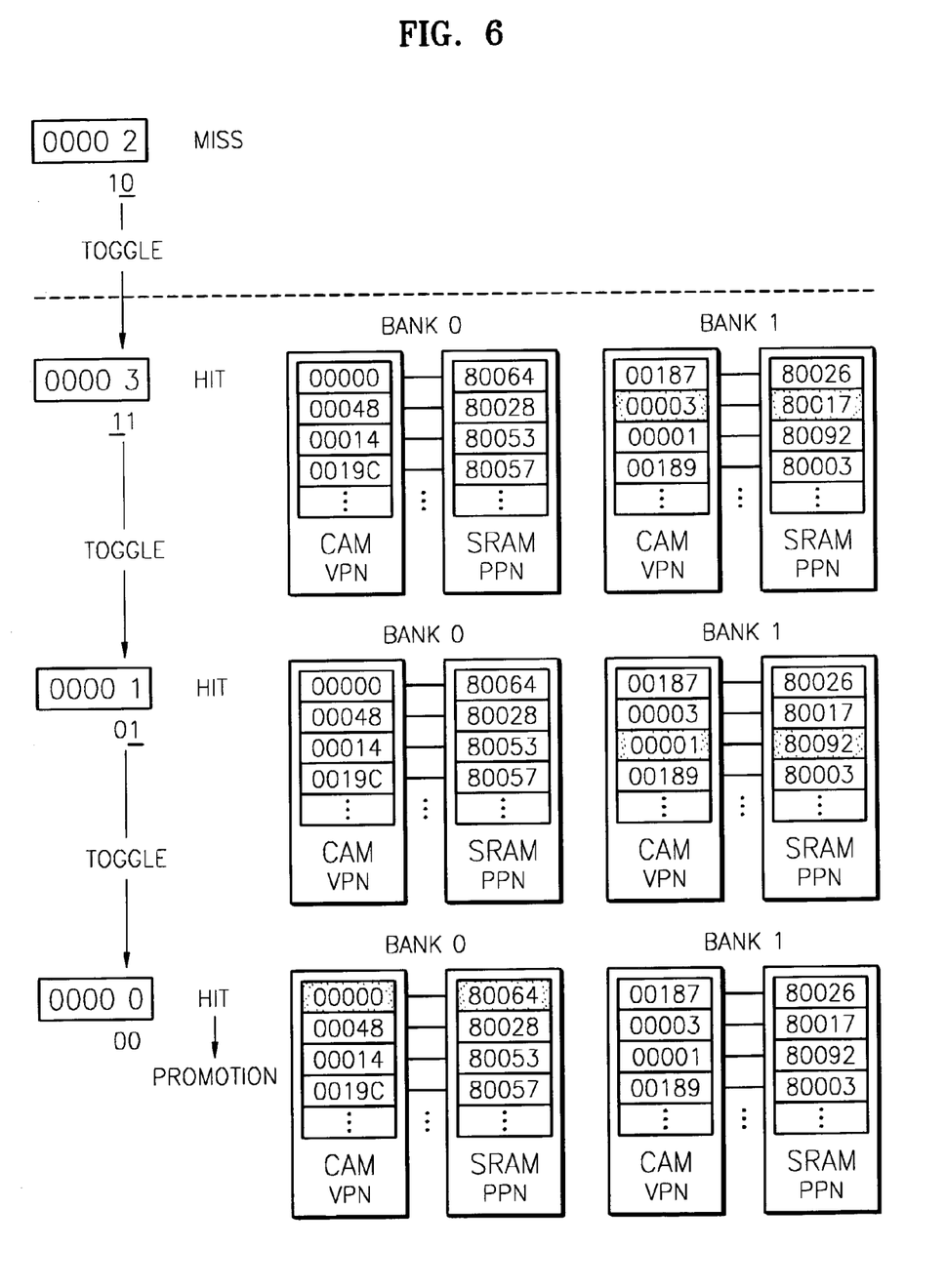
FIG. 6 is a block diagram illustrating a process for searching for continuous virtual page numbers according to a preferred embodiment of the present invention.

While the miss for the virtual page number 00002 is processed, a memory management unit (MMU) (not shown) accesses the banked TLB 200 in the order shown in FIG. 6, to check whether or not there are virtual page numbers 00000, 00001, and 00003 adjacent to the virtual page number 00002, to which access failed, in the banked TLB 200.

FIG. 6 is a block diagram illustrating a process for searching for continuous virtual page numbers according to a preferred embodiment of the present invention. Referring to FIGS. 3 and 6, a method for confirming whether or not there are virtual page numbers 00000, 00001, and 00003 adjacent to the virtual page number 00002, to which access failed, will now be explained. Here, the banked TLB 200 accesses the three virtual page numbers 00003, 00001, and 00000 in three cycles.

First, if a miss for the virtual page number 00002 (a 20 bit, hexadecimal number) occurs, the MMU or the banked TLB 200 generates 00003 by toggling 00002, and determines whether or not a hit for 00003 occurs.

If a hit for 00003 occurs in the banked TLB 200, the banked TLB 200 toggles 00003 to generate 00001, and determines whether or not a hit for 00001 occurs.

If a hit for 00001 occurs in the banked TLB 200, the banked TLB 200 toggles 00001 to generate 00000, and determines whether or not a hit for 00000 occurs.

If a hit for 00000 occurs in the banked TLB 200, the physical page numbers corresponding to the respective virtual page numbers 00002, 00003, 00001, and 00000 are promoted to the promotion TLB 400 and form one entry.

Here, "promotion" means registering the virtual page number 00002, to which access failed, and continuous virtual page numbers 00000, 00001, and 00003 succeeding the virtual page number 00002, as one entry of the promotion TLB 400.

Since the access of the virtual page number described above is performed while the MMU processes a miss, it does not take additional processing time.

Since there are the virtual page numbers 00000, 00001, and 00003 succeeding the virtual page number 00002, to which access failed, in the banked TLB 200, the physical page numbers 80064, 80092, and 80017 corresponding to the continuous virtual page numbers 00000, 00001, and 00003 are allocated to PPN units 321, 331, and 351, respectively, and stored.

The 3 entries corresponding to virtual page numbers (00000, 00001 and 00003), respectively, are nullified. A new physical page number (NPPN: 80035), which corresponds to the virtual page number (00002) to which access failed, is output from the memory mapping table and is stored in the PPN unit 341 of the promotion TLB 400.

Only the virtual page number 00002 to which access failed and the virtual page numbers 00000, 00001, and 00003 succeeding the virtual page number 00002 are promoted. The structure of each entry after promotion is shown in FIG. 4.

Therefore, since the TLB according to an embodiment of the present invention can register the virtual page number 00002 to which access failed, and continuous virtual page numbers 00000, 00001, and 00003 succeeding the virtual page number 00002, as one entry of the promotion TLB 400, and at the same time remove the virtual page numbers 00000, 00001, and 00003, from the banked TLB 200, the removed three entries can be reused.

Also, since one entry of the promotion TLB 400 has information on three entries of the banked TLB 200, temporal locality can be efficiently used.

However, if a virtual page number that is 00005 (a 20 bit, hexadecimal number) generated by the CPU is input to the TLB, a miss occurs in the banked TLB 200 and the promotion TLB 400.

Therefore, while the MMU processes the miss for the virtual page number 00005, the banked TLB 200 is accessed to check, by the method shown in FIG. 6, whether or not there are virtual page numbers (for example, 00004, 00006, and 00007) succeeding the virtual page number 00005, to which access failed, in the banked TLB 200.

If the result indicates that there are no virtual page numbers 00004, 00006, and 00007 succeeding the virtual page 00005 in the banked TLB 200, the MMU or the banked TLB 200 stores a new physical page number NPPN corresponding to the virtual page number 00005 output from the memory mapping table, in an entry of the second bank 205 of the banked TLB 200.

If the second bank 205 is full (all entries are full), an entry having the oldest physical page number may be replaced by a new entry having the new physical page number NPPN.

Referring to FIG. 4, a case where the virtual page number 00002 is again input to the TLB after the continuous virtual pages including the virtual page number 00002 are promoted to the promotion TLB 400 will now be explained. If the virtual page number 00002 is input to the TLB, the entries of the banked TLB 200 and the promotion TLB 400 are accessed.

As a result, a miss occurs in the banked TLB 200, a hit occurs in the promotion TLB 400, and by X and TAG_LSB of the virtual page number 00002, only a physical page 80035 corresponding to the virtual page number 00002 is sent to the multiplexer 440 selectively among the four physical page numbers 80064, 80092, 80035, and 80017 in PPN units 320 through 350 respectively.

Figure 5:
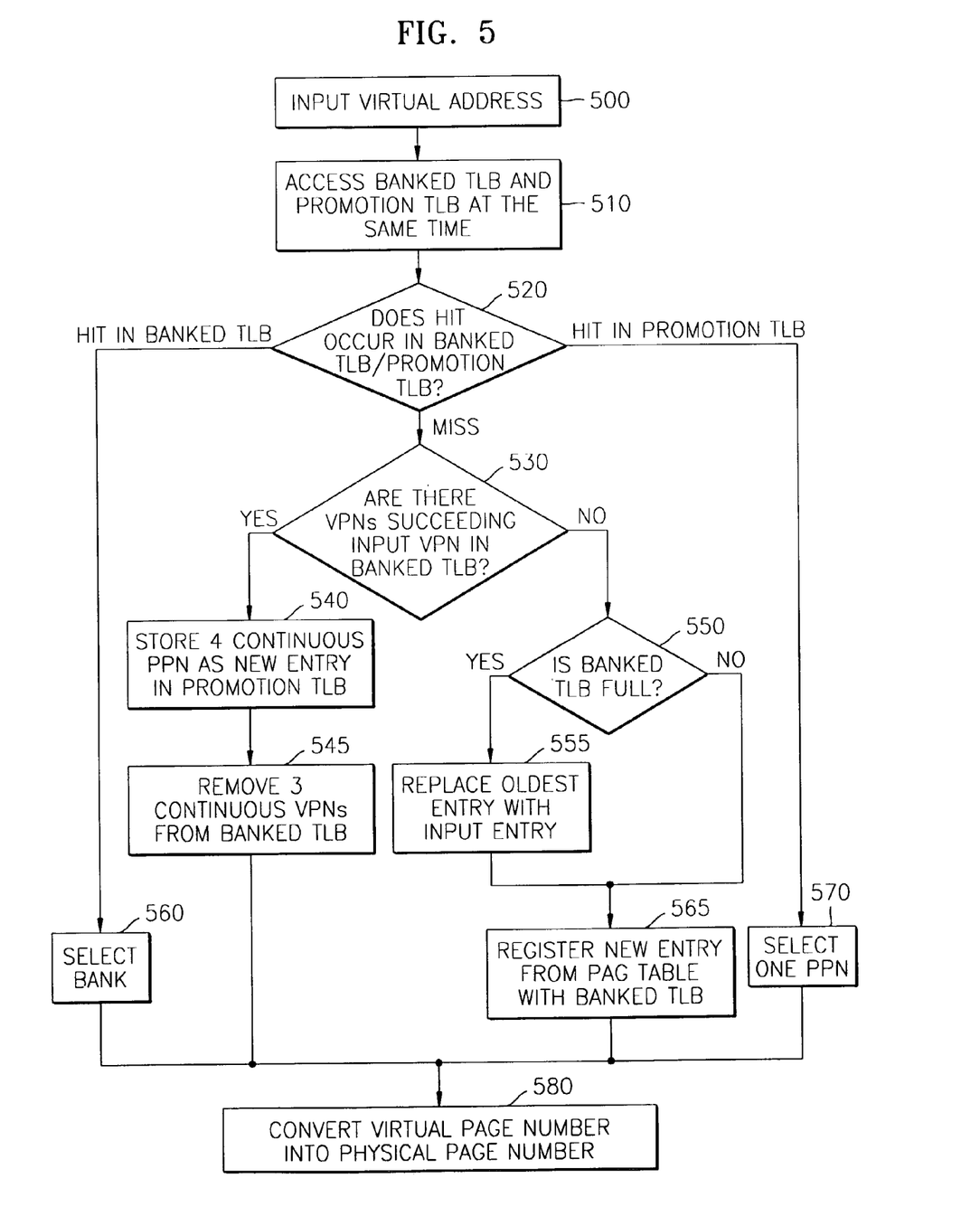
FIG. 5 is a flowchart illustrating the operation of a TLB according to a preferred embodiment of the present invention.

FIG. 5 is a flowchart illustrating the operation of a TLB according to a preferred embodiment of the present invention. Referring to FIGS. 2 through 5, the operation of the TLB according to the present invention will now be explained.

First, if a virtual address having a virtual page number and an offset is input to the TLB in step 500, the TLB accesses each entry or each virtual page number of the banked TLB 200 and the promotion TLB 400 at the same time in step 510.

In step 520, it is determined whether or not a hit HIT or a miss MISS for the input virtual page number occurs in the banked TLB 200 or in the promotion TLB 400. If a hit HIT occurs in the banked TLB 200, the first bank 203 or the second bank 205 is selected by the multiplexer 430 in step 560, and a physical page number corresponding to the input virtual page number is output. Accordingly, the TLB converts the virtual page number into the physical page number in step 580.

If a hit occurs in the promotion TLB 400, in response to X bit and TAG_LSB, the multiplexer 420 selects one physical page number and outputs the selected physical page number to the multiplexer 440 in step 570. Accordingly, the TLB converts the virtual page number into the physical page number in step 580.

However, if a miss occurs both in the banked TLB 200 and in the promotion TLB 400, the banked TLB 200 determines whether or not there are three continuous virtual page numbers succeeding the virtual page number, to which access failed, in the banked TLB 200 in step 530.

If there are three continuous virtual page numbers (for example, 00000, 00001, and 00003) succeeding the virtual page number (for example, 00002) to which access failed in the banked TLB 200, four physical page numbers, including a new physical page number 80035 that corresponds to the virtual page number 00002, to which access failed, is output from the page mapping table, and physical page numbers 80064, 80092, and 80017 that correspond to the three continuous virtual page numbers 00000, 00001, and 00003 succeeding the virtual page number 00002, to which access failed, are stored as a new entry of the promotion TLB 400 in step 540.

Therefore, if promotion is performed, one entry of the promotion TLB 400 has one virtual page number and four physical page numbers.

While step 540 is performed, the three virtual page numbers 00000, 00001, and 00003 succeeding the virtual page number 00002, to, which access failed, are removed from respective entries of the banked TLB 200 in step 545.

Also, the TLB outputs a new physical page number 80035, which corresponds to the virtual page number 00002, to which access failed, and is output from the page mapping table, to the multiplexer 440. As a result, the TLB converts the virtual page number into a physical page number in step 580.

However, if the result of step 530 indicates that there are not three continuous virtual page numbers succeeding the virtual page number to which access failed in the banked TLB 200, the TLB determines whether or not all entries of the banked TLB 200 are full in step 550.

If all entries of the banked TLB 200 are full, the oldest entry among all entries of the banked TLB 200 is replaced by an entry containing the new physical page number in step 555 A new entry having the virtual page number, to which access failed, and the new physical page number is registered in the banked TLB 200. Then, since the TLB 200 outputs the new physical page number to the multiplexer 430, the virtual page number is converted into the physical page number by the TLB in step 580.

Figure 7:
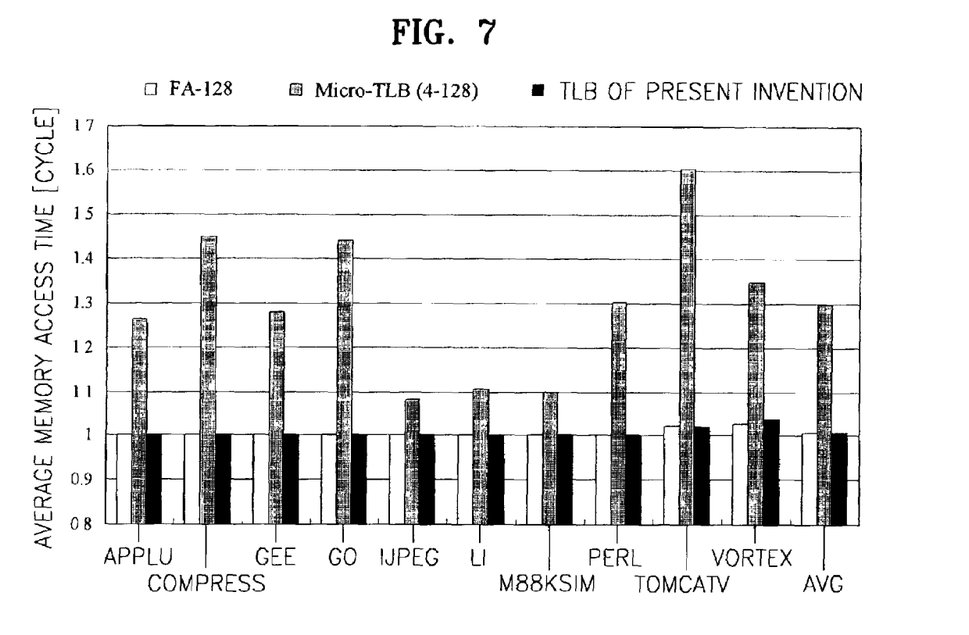
FIG. 7 is a graph illustrating the average memory access times of benchmark programs, and the average memory access time of a TLB according to the present invention.

FIG. 7 is a graph illustrating the average memory access times of benchmark programs, and the average memory access time of a TLB according to the present invention.

Referring to FIG. 7, FA-128 is a prior art full-associative TLB having 128 entries, and Micro_TLB (4–128) is a TLB including a small TLB having four entries, and a large TLB having 128 entries.

Referring to FIG. 7, the average memory access time of the TLB according to the present invention is shorter than that of the Micro_TLB (4–128), and is almost the same as the average memory access time of the FA-128.

Figure 8:
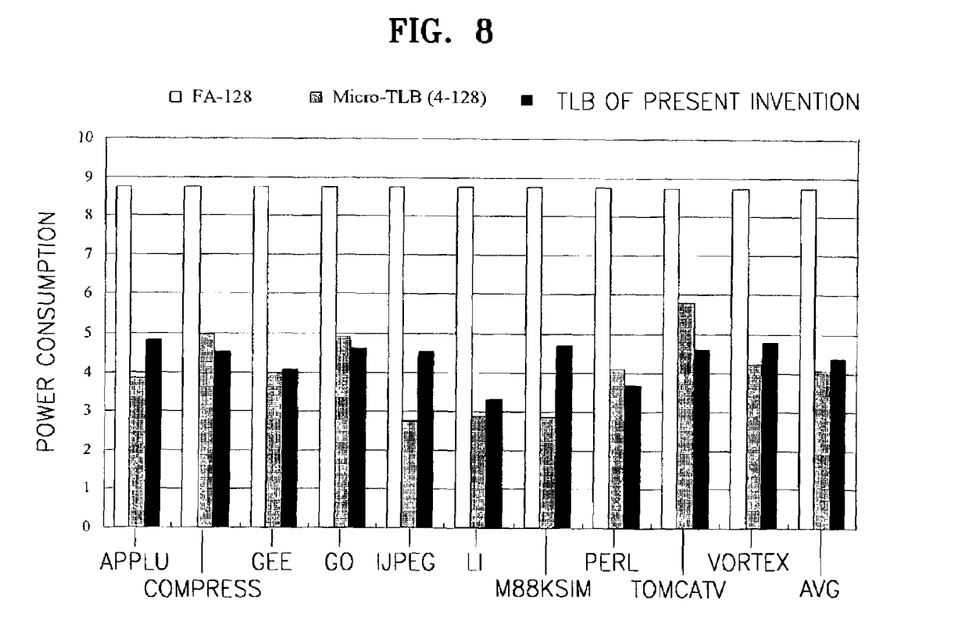
FIG. 8 is a graph illustrating the power consumption of benchmark programs and the power consumption of a TLB according to the present invention.

FIG. 8 is a graph illustrating the power consumption of benchmark programs and the power consumption of a TLB according to the present invention. Referring to FIG. 8, the power consumption of the TLB according to the present invention is much lower than that of the FA-128.

Accordingly, a TLB according to the present invention can reduce power consumption and at the same time reduce the average memory access time.

When the number of entries of the banked TLB is m, and the number of entries of the promotion TLB is n, the mapping effect of the TLB according to the present invention is m+n×(the size of a page indicated by the virtual page number of the promotion TLB/the size of the page indicated by the virtual page number of the banked TLB).

For example, if the size of a page indicated by the virtual page number of the promotion TLB is 16 KB and the size of the page indicated by the virtual page number of the banked TLB is 4 KB, the mapping effect by the TLB of the present invention is m+4n.

Also, if the size of a page indicated by the virtual page number of the promotion TLB is 32 KB, and the size of the page indicated by the virtual page number of the banked TLB is 4 KB, the mapping effect by the TLB of the present invention is m+8n.

A TLB according to the present invention can result in a high performance improvement over conventional TLBs even though the TLB uses a small number of entries.

Preferred embodiments have been explained above and are shown. However, the present invention is not restricted to the above-described embodiments and many variations are possible within the spirit and scope of the present invention. The scope of the present invention is not determined by the above description but by the accompanying claims.

As described above, the TLB according to the present invention and a memory management system using the same can support two page sizes without the help of an operating system.

Also, the TLB and memory management method using the same can reduce power consumption and improve the performance.

What is claimed is:

1. A fully-associative translation look-aside buffer (TLB) which converts a virtual address into a physical address, the TLB comprising:
   a first TLB having a plurality of banks;
   a second TLB having a plurality of entries, each of which having one virtual page number and $2^N$ physical page numbers, wherein N is a natural number; and
   a selection circuit for outputting an output signal of the first TLB to the second TLB in response to a selection signal, wherein each bank of the first TLB has a plurality of entries, each of the plurality of entries has one virtual page number and one physical page number and if each of $(2^N-1)$ physical page numbers among the $2^N$ physical page number is sent from the first TLB to the second TLB, the $(2^N-1)$ physical page numbers are nullified in the respective entries of the first TLB.

2. The fully-associative TLB of claim 1, wherein the size of a page indicated by a virtual page number of the first TLB is different from the size of a page indicated by a virtual page number of the second TLB.

3. The fully-associative TLB of claim 1, wherein the $2^N$ physical page numbers are physical pages numbers corresponding to continuous virtual page numbers, respectively.

4. The fully-associative TLB of claim 1, wherein the physical page numbers forming the entry of the first TLB are different from the physical page numbers forming the entry of the second TLB.

5. The fully-associative TLB of claim 1, wherein each bank of the first TLB is selected by low-order bits including the least significant bit of a virtual page number which is being input.

6. The fully-associative TLB of claim 1, wherein if the first TLB and the second TLB output a miss in response to the input virtual page number, and $(2^N-1)$ virtual page numbers adjacent to the virtual page number, to which access failed, are available in the first TLB, the $2^N$ physical page numbers having a physical page number corresponding to the input virtual page number and physical page numbers which correspond to the $(2^N-1)$ virtual page numbers adjacent to the virtual page number are sent from the first TLB to the second TLB.

7. The fully-associated TLB of claim 6, wherein the first TLB sends the physical page numbers corresponding to the adjacent $(2^N-1)$ physical page numbers, to the second TLB, and nullifies entries corresponding to the adjacent $(2^N-1)$ virtual page numbers.

8. The fully-associative TLB of claim 1, wherein if the first TLB and the second TLB output a miss in response to the input virtual page number, and $(2^N-1)$ virtual page numbers adjacent to the virtual page number, to which access failed, do not exist in the first TLB, the first TLB stores the input virtual page number and a new entry having a physical page number corresponding to the input virtual page number.

9. A fully-associative TLB for converting a virtual address having a virtual page number and an offset, into a physical address having a physical page number and the offset, the TLB comprising:
   a first TLB having a first bank and a second bank, wherein the first bank or the second bank has a plurality of entries, each of the plurality of entries having one virtual page number and one physical page number;
   a second TLB having a plurality of entries, each of the plurality of entries having one virtual page number and four physical page numbers; and
   a selection circuit which, in response to a selection signal, outputs an output signal of the first TLB to the second TLB, and if three physical page numbers among the four page numbers are sent from the first TLB, the three physical page numbers are nullified in the respective entries of the first TLB.

10. The fully-associative TLB of claim 9, wherein the four physical page numbers are physical page numbers corresponding to continuous virtual page numbers, respectively.

11. The fully-associated TLB of claim 9, wherein the physical page numbers forming an entry of the first TLB are different from the physical page numbers forming an entry of the second TLB.

12. The fully-associated TLB of claim 9, wherein the size of a page indicated by a virtual page number of the first bank or the second bank of the first TLB is different from the size of a page indicated by a virtual page number of the second TLB.

13. The fully-associative TLB of claim 9, wherein the first bank or the second bank of the first TLB is selected by low-order bits including the least significant bit of a virtual page number which is being input.

14. A fully-associative translation look-aside buffer (TLB) for converting a virtual address into a physical address, the TLB comprising:
   a first fully-associative TLB having a plurality of banks, each of the plurality of banks having a plurality of entries, each of the plurality of entries having a first page size and indicating the first page; and
   a second fully-associative TLB having a plurality of entries, each of the plurality of entries having a second page size and indicating the second page,
   wherein one entry indicating the second page size has mapping information on a virtual page number to which access failed, and mapping information on a plurality of virtual page numbers succeeding to the virtual page number.

15. The fully-associated TLB of claim 14, further comprising:

a selection circuit for sending mapping information on the plurality of virtual page numbers adjacent to the virtual page number to which access failed in response to a selection signal.

16. A memory management method using a translation look-aside buffer (TLB), the method comprising:

accessing a first fully-associative TLB having a plurality of banks, each of the plurality of banks having a plurality of entries, each entry having one virtual page number and one physical page number, and a second TLB having a plurality of entries, each entry having one virtual page number and a plurality of physical page numbers;

if a miss for a first virtual page number occurs in the first TLB and in the second TLB, accessing the first TLB to determine whether or not a predetermined number of virtual page numbers adjacent to the first virtual page number exist in the first TLB, while the miss for the first virtual page number is processed;

if the predetermined number of virtual page numbers adjacent to the first virtual page number exist in the first TLB, sending physical page numbers corresponding to the predetermined number of respective virtual page numbers adjacent to the first virtual page number, to the second TLB; and generating a new entry of the second TLB containing a physical page number corresponding to the first virtual page number to which access failed, and physical page numbers corresponding to the predetermined number of respective virtual page numbers adjacent to the first virtual page number, and outputting the physical page number corresponding to the first virtual page number.

17. The memory management method of claim 16, wherein the size of a page indicated by a virtual page number of the first TLB is different from the size of a page indicated by a virtual page number of the second TLB.

18. The memory management method of claim 16, wherein each bank of the first TLB is selected by low-order bits including the least significant bit of the first virtual page number.

19. The memory management method of claim 16, wherein the new entry of the second TLB contains mapping information on each of a predetermined number of entries of the first TLB.

20. The memory management method of claim 16, further comprising:

nullifying entries of the first TLB corresponding to the predetermined number of respective virtual page numbers adjacent to the first virtual page number.

21. The memory management method of claim 16, wherein the physical page numbers forming the entry of the first TLB are different from the physical page numbers forming the entry of the second TLB.

22. A memory management method using a translation look-aside buffer (TLB), the method comprising:

accessing a first fully-associative TLB having a plurality of banks, each of the plurality of banks having a plurality of entries, each entry having one virtual page number and one physical page number, and a second TLB having a plurality of entries, each entry having one virtual page number and a plurality of physical page numbers; and in response to the result of an access to the first TLB, sending physical page numbers corresponding to the predetermined number of respective virtual page numbers adjacent to a first virtual page number from the first TLB to the second TLB, wherein the physical page numbers forming an entry of the first TLB are different from the physical page numbers forming an entry of the second TLB.

* * * * *